United States Patent [19]

Bolton

[11] Patent Number: 5,030,995
[45] Date of Patent: Jul. 9, 1991

[54] PHOTOCOPY LETTER ADDRESSER

[76] Inventor: John D. Bolton, 711 Lido Park Dr., Unit J, Newport Beach, Calif. 92663

[21] Appl. No.: 569,294

[22] Filed: Aug. 20, 1990

[51] Int. Cl.$^5$ .......................................... G03G 15/00
[52] U.S. Cl. .................................... 355/244; 355/40; 226/33
[58] Field of Search ................ 355/244, 308, 309, 40, 355/202; 226/27, 33

[56] References Cited

U.S. PATENT DOCUMENTS 2,760,290  8/1956  Miller et al. ...................... 226/33 X
3,775,007  11/1973  Davidson ............................ 355/202

OTHER PUBLICATIONS

Xerox Disclosure Journal, vol. 1, No. 5, May 1976, Guenther, Joachim, "Address Label Printing Device", p. 87.

Primary Examiner—Joan H. Pendegrass
Attorney, Agent, or Firm—John D'Arcy Bolton

[57] ABSTRACT

The apparatus moves a strip of names and addresses, one at a time, into alignment with the text body of a master letter and photocopies both together, usually on the users business stationery. The result is a composite photocopy of the text of the master letter with a separate name and address at the top. Each copy is a finished letter, on the users letterhead, addressed and ready to mail. A typical photocopy machine will produce about 700 letters per hour, each separately addressed.

5 Claims, 1 Drawing Sheet

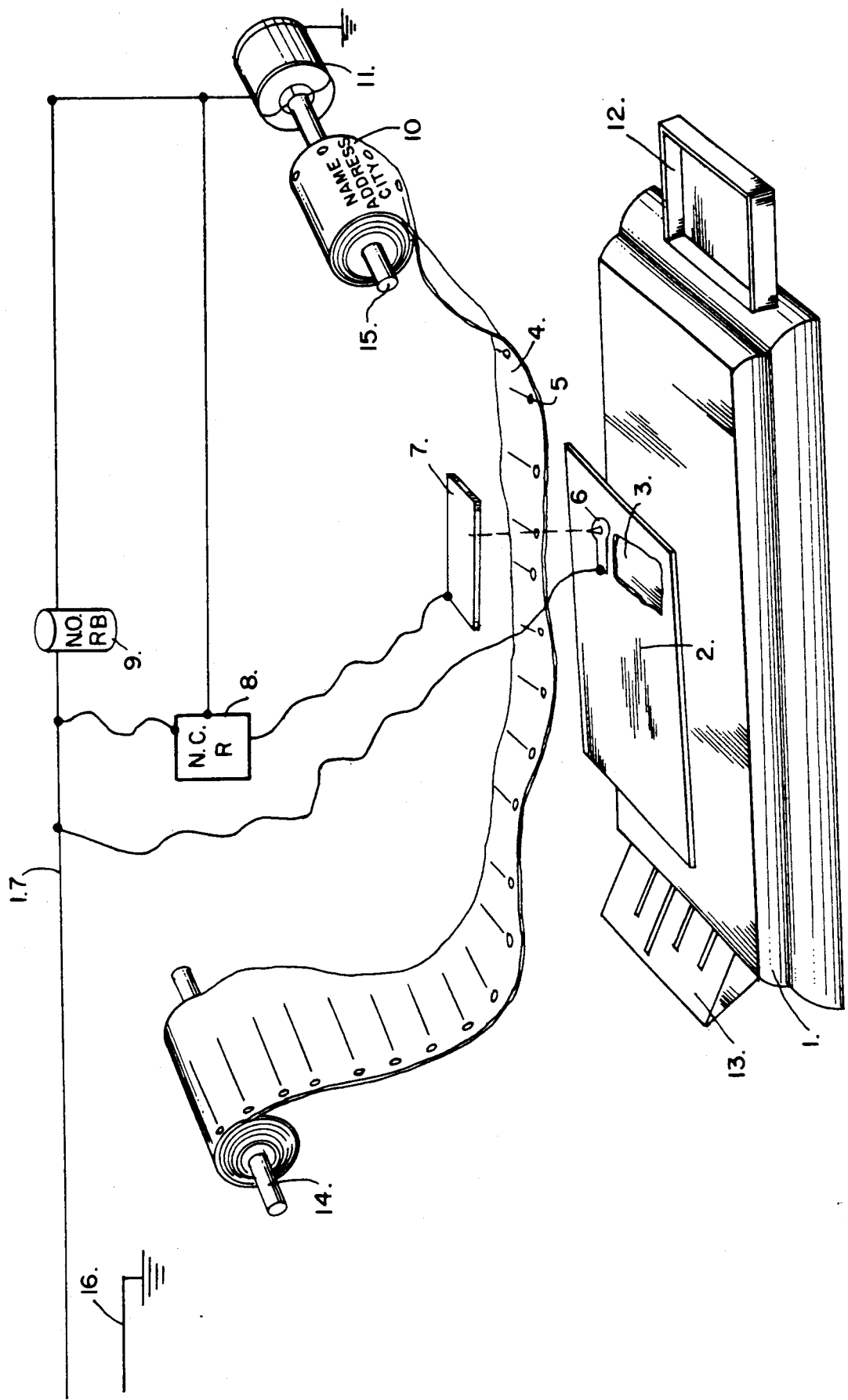

PHOTOCOPY LETTER ADDRESSER

FIELD OF THE INVENTION

This apparatus relates to a method of automatically producing large numbers of letter or brochures that have individual names and addresses on them by making a series of composite photocopies of the text of a master letter and a single name and address from a list where the list moves to the next name and address for each new photocopy. The result is the production of a set of letters where each one has a separate name and address on the top of it.

REFERENCES

U.S. Pat. No. 3,775,007, 11/73 Davidson, U.S. Pat. No. 3,990,794, 11/76 Nittmann, U.S. Pat. No. 3,880,521, 4/75 Eppe, Bolton application U.S. Ser. No. 07/034,671 4/6/87.

The improvements described in this application offers a much simpler mechanism than any previously described, a new way to align the movable list of names and addresses with the fixed master letter and a simple way to synchronize the operation of the described device with operation of the photocopy machine.

DESCRIPTION OF THE PRIOR ART

Several devices to produce one photocopy from two original documents have been described. The above references are for devices that have the improvement of offering a method of moving selected positions of a list in position with a fixed master letter as each photocopy is produced.

All of the described devices are have extremely complex mechanisms. Davidson, (in claim 1) offers a double projecting device, projecting the master letter with one projector, the names and addresses with another, with no method to correctly position the names and addresses which have wide variation in size. The Nittmann patent, (in claim 1 and 2), is limited to documents that move at right angles to each other.

Only one of them offers any method of accurately position the names list with the letter. Eppe describes a rather impractical system where an electric eye that would have to recognize thousands of different pre-encoded marks on the names list. (middle page 3)

SUMMARY OF THE INVENTION

The apparatus moves a strip of names and addresses, one at a time, into alignment with the text body of a letter master letter and photocopies both together, usually on the users business stationary. The result is a composite photocopy of the text of the master letter with a separate name and address at the top. Each copy is a finished letter, on the users letterhead, addressed and ready to mail. A typical photocopy machine will produce about 700 letters per hour, each separately addressed.

It is an object of my invention to provide a convenient way for a small office to quickly produce a large number of letters, brochures or bills with individual names and addresses on them.

Another object of my invention is to offer a method of positioning the names strip with variable sizes if names and addresses exactly with the top of the text of the master letter for each successive combination photocopy.

Another object of my invention is to make the change of names, that is movement in the names strip, automatically syncronous with rest phase of the photocopy machine. This improvement allows the user to set the photocopy machine to produce the same number of photocopies as are on his strip list of names and abandon the combination of machines to automatic production.

Another object of my invention is to offer a convenient method of producing letters from selected groups of the names list, say all females on the list or persons over 50 years of age.

BRIEF DESCRIPTION OF THE DRAWINGS

In the drawing FIG. 1 is diagrammatic cut away view of the apparatus showing the parts in exploded view.

DESCRIPTION OF THE PREFERRED EMBODIMENT

In describing on selected embodiment of my invention illustrated in the drawing, specific terminology is resorted to for the sake of clarity; however, it is not intended to be limited to the specific terms so selected and it is to be understood that each specific term includes all technical equivalents which operate in a similar manner to accomplish a similar purpose.

The application uses the terms "letters and brochures" but the concept includes any sort of master text where there is a separate and individual variation. Some examples are bills, court pleadings in a class action suit, any sort of report or magazine covers with individiual names and addresses.

This application refers to names and addresses, but the concept includes and sort of individual information that is melded with the text of a master document to make a composite photocopy. Some examples are reports of the activities of a list of individual stores or reports of production from a list of individual oil wells. The concept of names and addresses includes a salutation and a line of information about the named person.

This application describes a hole in the master letter above the text where the name and address will appear. The concept included in this application includes a clear window in the letter text or a short letter text with a gap over it where the name and address will appear.

Turning now to specific embodiment of may invention selected for illustration, in FIG. 1, 1 is a photocopy machine,
2 is users master letter,
3 is a hole in the master letter 2,
4 is a strip of paper with the users list of names and addresses,
5 is a hole in the marginal portion of names strip list 4,
6 is charged contact pin,
7 is contact plate,
8 is a normally closed relay,
9 is a normally open push button switch,
10 is individual name on names strip 4,
11 is a motor,
12 is photocopy paper feed box,
13 is photocopy receiver tray,
14 is a coaster axle which holds the rolled names strip 4,
15 is a motor driven roller axle,
16 is neutral power line,
17 is electrical power supply,

USER OPERATION OF THE APPARATUS

The user makes a relatively large hole (3) in the top of his master letter (2) and tapes the contact pin 6 with wire connection to the back of his master letter where he wants the name and address to appear in relation to the finished copy.

The user types his unique list of names and addresses and possibly a salutation such as "Dear George:" on a continuous strip of rolled paper, (4). A roll of adding machine paper is convenient for this purpose. For purposes of this patent this strip of paper will be called "names strips".

Directly opposite each salutation on the names strip on the marginal portion, the user punches a hole.

The user places the names strip on the coaster axle, (14), and draws the strip under the apparatus but over and behind the master letter 2 and the hole in it 3. He also places the names list on top of the charged contact pin 6. He attaches the beginning of the names strip onto the motor powered axle 15.

The user now places the whole apparatus on top of a photocopy machine and loads his chosen blank paper into the feed box 12. That would frequently be business letterhead stationary.

He presses the push button 9 momentarily and waits for the names strip 4 to be moved up and stop. Then he presses the photocopy machine start button and waits for a photocopy to be made. What emerges from the photocopy machine is a completely finished letter on his own letterhead with his master letter text and the first name and address at the top.

After the first photocopy is complete and the photocopy machine is at rest he pushes the 9 again and the cycle repeats. What emerges this time another completely finished letter on his letterhead, but this time the second name and address is at the top. When he is satisfied with that he pushes the button again and again, each time obtaining a new letter with a new name and address at the top until there is a letter for every name and address on the names strip list.

ELECTRO-MECHANICAL OPERATION OF THE APPARATUS

Power from the electrical feed line is fed to a normally closed relay 8 and a contact push button 9 and to a charged contact pin 6.

In the rest phase of the apparatus the relay contacts 8 are open because the charge contact 6 is in contact with the contact plate 7 through a hole 5 in the names list. At this stage power is passing through those two elements into the relay coil and holding the relay contacts 8 open. As a result no power is passing to the motor 11 and the names strip is not moving.

To start the cycle the user pushes the buttom 9 momentarily. That closes the push button contacts 9 sending power to the motor 11 which advances the names strip slightly.

As soon as the names strip advances, contact between the charged contractor pin 6 and the contact plate 7 is broken because the hole 5 has moved away from the charged contact pin 6. Now names strip papers covers and insulates the charged contact pin 6 from making contact with the contact plate 7.

Upon interruption of power through the contact pin circuit, the relay 8 returns to its normally closed position and power is sent to the motor 11 advancing the names strip.

When the names strip has advanced sufficiently, the next hole (5) in the series of holes in the names strip passes over the contact pin 6. Contact is made with the contractor plate 7 through the hole 5. Power is sent to the normally closed relay 8 causing it to open. That interrupts power supply to the motor 11 which causes names list to stop advancing.

The holes in the margin of the names strip 5 are opposite and in line with each name. When the names strip stops at the contact pin 6, it is stoping with the next name and address in alignment with the master letter text. Individual names and addresses vary from 2 lines to six lines long. The described improvement causes the described apparatus to automatically adjust to stop in the correct position for various lengths of names and addresses.

The user makes a photocopy in the ordinary way. What emerges is a finished letter, usually on the user letterhead, with a name and address on the top and the letter text below.

When the users wants to produce another letter using the next name he pushes the push button and the cycle repeats itself.

ALTERNATE FORMS AND IMPROVEMENTS

The described device could be made entirely automatic with the addition of a photocell and a normally closed timed relay. In this improvement the relay would be held open by power from the photocell as long photocopy machine light was on, that is as long as the photocopy machine is actually making a copy.

When the photocopy machine light turns off, power from the photocell would drop off allowing the rely to close and conduct power to the names strip motor 11 advancing the names strip. The timer would shortly thereafter open circuit to the names strip motor 11.

The effect of this short close and opening cycle is to replace the push button in starting the names strip moving. As each copy is completed the photocopy machine light goes off, the timed relay closes for a brief period, names strip advances until the charged contact pin 6 makes contact through the next names strip hole 5, it stops there, waits for the photocopy machine to produces another copy. When the photocopy machine light goes off again the relay closes for a short time, the names list is advanced, another copy is produced, and so on indefinitely.

The effect of the addition of the photocell and timed relay is to make the whole system automatic. The user could set the photocopy machine for the number of names on his names strip and start the photocopy machine. The described photocopy addresser would move the names strip up and align the addresses automatically each time the photocopy machine completes a copy until the user had a separately addressed letter for every name on his list.

Another improvement is to have a plurality of holes in the names strip and a matching plurality of charged contact pins. The position of the holes could correspond to various classes of names. By using these holes alternately the user could send letters to one or several selected groups and omit the others.

For example, if the user placed the hole for all male names ¼" from the margin and the hole for all female names ½" from the margin and he set his charged contact pin (6) ½" from the margin, the charged contact pin 6 would only fall into holes opposite female names. As a result, the names strip would only stop at female names and all letters produced would have female names and addresses on them.

Alternately, he could set his charged contact pin ¼" from the names strip margin and produce only letters addressed to males or he could use two charged contact pins set ¼" and ½" from the margin of the names strip and produce letters to every name on the list.

Some other catagories of names are people over and under 50, people who made an inquiry about a product and people who are actually customers and former customers. The user may want to send one brochure or price list to every name, but on other occasions he may wish to send a particular brochure to one or more catagories of names, say only credit worthy customers.

The user can move people among his catagories by covering a hole on the names strip with tape and punching a new hole in a different marginal position.

ADVANTAGES OF MY INVENTION

An advantage of my invention is that the user can produce individually addressed letters from a small office photocopy machine that the user is likely to have available already, as opposed to alternative methods of producing individual letters that would require him to purchase a computer system with a lazer printer.

An advantage of my invention is that it will produce a very large number of individually addressed names and addresses in a relatively short time. A typical photocopy machines produce about 700 copies an hour, 5600 in an eight hour day as opposed to a non lazer computer printer system that will reproduce only about 60 letters and hour, 480 in a day.

Another advantage of my invention is that the apparatus stops the name and address whether long or short exactly is alignment with the text body. Names and addresses may be only two lines long but can be up to six lines. A system that advances a name strip a set amount for each name would place some too high on the letter and cut the bottom lines off others.

HAVING THUS DESCRIBED MY INVENTION I CLAIM:

1. An apparatus for producing individually named and addressed letters using a fixed master letter and a strip of names and addresses with a hole in the margin of said strip of names and addresses opposite each name, in co-operation with a photocopy machine where the said fixed master letter has a hole in it which the said names strip will pass behind and an electrically charged contact pin is placed near the said hole where it is desired to have the names and addresses to appear on the finished combination photocopy, and the said electrically charged contact pin together with a contact plate and a normally closed relay conducting power to a names strip advancing motor in combination with a means to advance the said names strip, and a contacting push button conducting power when closed to the said names strip advancing motor and where, pushing the said push button momentarily connects the power supply to the said names list advancing motor, causing the said names list to advance slightly, which causes the said hole to move away from the said charged contact pin, thereby breaking the electrical connection between the said electrically charged contact pin and the said contact plate, and allowing the said normally closed relay to close and conduct power to the said names list advancing motor, causing the said names strip to advance until the said electrically charged contact pin falls through the next hole in the said names list, thus making contact with the said contact plate connected to the said normally closed relay, opening said relay which interrupts the power supply to the names list advancing motor and stoping the said names strip in the desired position at which time the user makes a photocopy of the combination in the ordinary way and what is produced is a copy of his master letter text with one name and address from said names strip in his desired position.

2. An apparatus according to claim 1 and where there is a means to synchronize the movement of the list with the rest phase of the photocopy machine.

3. An apparatus according to claim 2 and where the means to synchronize the movement of the names strip with the rest phase of the photocopy machine is a photoelectric cell in co-operation with a timed relay arranged so that when the photocopy machine light turns off power flows to the said timed relay, causing it to close and conduct power to the said names strip advancing motor and the time feature shortly thereafter opens the said relay so that the names list is advanced for a short time, moving the said names list hole away from the said electrically charged contact pin and repeating the above described cycle.

4. An apparatus according to claim 3 and where there is a means to only produce letters with a selected group of names and addresses on them.

5. An apparatus according to claim 4 and were the said means to produce letters from only a a selected group of names from the whole names strip list of names includes a plurality of holes in the said names list at several specific distances from the margin of said names list, and where all of one group have the names strip hole at one specific distance from the margin of said names strip list and all of another group of names have a hole at another specific distance from one the margin of said names strip, and where the user by positioning the said electrically charged contact pin in such a position that it can only make contact through one of the sets of holes causes the above described apparatus to not stop at every name where the said names strip hole does not pass over the said electrically charged contact pin.

* * * * *